(12) United States Patent
Irie et al.

(10) Patent No.: US 6,884,553 B2
(45) Date of Patent: Apr. 26, 2005

(54) NEAR-FIELD OPTICAL RECORDING MEDIUM AND NEAR-FIELD OPTICAL RECORDING METHOD

(75) Inventors: Masahiro Irie, Fukuoka (JP); Shuichi Maeda, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 197 days.

(21) Appl. No.: 09/949,795

(22) Filed: Sep. 12, 2001

(65) Prior Publication Data

US 2002/0034705 A1 Mar. 21, 2002

Related U.S. Application Data

(63) Continuation-in-part of application No. PCT/JP00/01404, filed on Mar. 8, 2000.

(30) Foreign Application Priority Data

Mar. 11, 1999 (JP) ........................................ P. 11-064406

(51) Int. Cl.[7] ................................................ G11B 7/24
(52) U.S. Cl. .................... 430/19; 430/270.15; 430/945; 428/64.8; 369/288; 369/273; 369/275.2
(58) Field of Search ................................. 430/945, 270, 430/13, 15, 19; 428/648; 369/288, 273, 275.2

(56) References Cited

U.S. PATENT DOCUMENTS

| 4,837,063 A | 6/1989 | Irie | 430/945 |
| 4,882,428 A | 11/1989 | Irie | 540/121 |

FOREIGN PATENT DOCUMENTS

| JP | 62-273212 | | 11/1987 |
| JP | 03-135977 | * | 6/1991 |
| JP | 03-261782 | * | 11/1991 |
| JP | 03-261947 | * | 11/1991 |
| JP | 05-232623 | * | 9/1993 |
| JP | 05-271649 | * | 10/1993 |
| JP | 06-263753 | * | 9/1994 |
| JP | 6-267071 | | 9/1994 |
| JP | 07-089954 | * | 4/1995 |
| JP | 07-173151 | * | 7/1995 |
| JP | 08-069083 | * | 3/1996 |
| JP | 08-143563 | * | 6/1996 |
| JP | 09-058188 | * | 3/1997 |
| JP | 09-071585 | * | 3/1997 |
| JP | 9-241254 | | 9/1997 |
| JP | 09-241625 | * | 9/1997 |
| JP | 10-060424 | * | 3/1998 |
| JP | 10-251251 | * | 9/1998 |
| JP | 2000-260063 | | 9/2000 |

OTHER PUBLICATIONS

Hamadao et al., "ultrahigh density optical recording by the use of the scanning near–field optical microscope", Reza Kenkyu, vol. 24(10) pp. 1045–1050 (1996).*
Machine translation of JP 06–267071.*
Machine translation of Jp 09–241254.*
Hamano et al., "Rewritable Near–field optical recording on Photchromic Thin films.", Japanese J. Appl. Phys., vol. 35 part 1 (3) pp 1764–1767 (Mar. 1996).*

* cited by examiner

*Primary Examiner*—Martin Angebranndt
(74) *Attorney, Agent, or Firm*—Oblon, Spivak, McClelland, Maier & Neustadt, P.C.

(57) ABSTRACT

A near-field optical recording medium comprises a recording layer capable of writing, reading and erasing information using an evanescent light, the evanescent light having a beam spot size smaller than the wavelength of a source light, wherein the recording layer is a stable amorphous layer mainly comprising a photochromic compound having a glass transition point of 55° C. or higher and a molecular weight of 3000 or less.

14 Claims, 12 Drawing Sheets

NEAR-FIELD OPTICAL RECORDING MEDIUM AND NEAR-FIELD OPTICAL RECORDING METHOD

BACKGROUND OF THE INVENTION

1. Field of the Invention

This invention relates to a medium and a method for near-field optical recording which are capable of writing, reading and erasing information using an evanescent light having a beam spot size smaller than the wavelength of a source light.

2. Description of the Related Art

Various attempts for achieving high-density optical recording, such as a super-resolution system, a pit edge recording system, and a V-groove systems, have been made. However, because all these techniques rely on a heat mode recording system, the recording densities realized by these techniques have reached the possible maximum. It is a photon mode that has recently been expected to exceed the limits of the heat mode recording system. Photon mode recording is a system of using light energy per se for optical recording. Since a photon mode recording system is capable of wavelength division multiplexing and polarized light division multiplexing, a plurality of signals can be recorded in the same pit to achieve a high recording density.

In wavelength multiplexing, however, because of difficulty in obtaining a plurality of photochromic compounds having, for example, different absorption wavelengths, the recording density that could be reached is not more than about 5 times that achieved by a general heat mode recording system. The recording density reached by a polarized light multiplexing system is not more than about twice that heretofore achieved by the state-of-the-art recording systems. Photochemical hole burning is capable of achieving a multiplexity of 100 or more but requires a low temperature of 77 K or lower for writing and reading.

In order to overcome these problems, a recording system using an electrical field by a scanning tunneling microscope (STM) and electromagnetic wave irradiation (see JP-A-2-98849) and an optical recording system using an evanescent light (see E. Betzig et al, *Appl. Phys. Lett.*, vol. 61, p. 142 (1992) have been proposed.

These systems are disadvantageous in that the electrodes for applying an electrical field or a magnet for opto-magnetic recording makes the apparatus complicated.

To solve this problem, JP-A-6-267071 discloses a rewritable optical recording method in which an evanescent light having a smaller spot size than the wavelength is used as a light source for writing, reading and erasion, and the recording layer of the optical recording medium comprises a polymer dispersion of a photochromic compound having thermal irreversibility, such as a diarylethene derivative represented by formula:

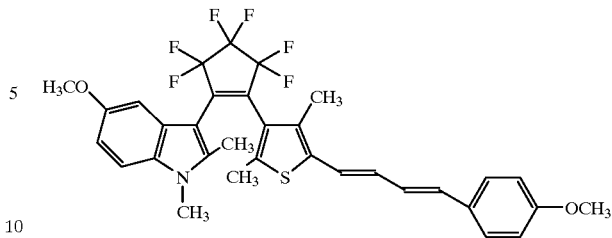

According to the method disclosed, high-density recording can be accomplished without using electrodes or a magnet.

In order to effect optical recording with an evanescent light without using electrodes or a magnet, it is necessary for the recording layer itself to show reversible changes between two states accompanied by color changes by a light source with no other physical or chemical perturbation and have thermal stability in each state. JP-A-6-267071 have proposed such a recording layer and succeeded in forming recorded pits whose size is $1/10$ to $1/100$ as large as the pit formed in the state-of-the-art optical recording media by using an evanescent light without using electrodes nor a magnet, thereby achieving 100- to 10,000-fold increased recording density.

In order to increase the recording density of optical recording media, it is important, above all, that the recording layer should undergo a large change in its state, for example, absorbance or refractive index upon irradiation. In using a photochromic compound, it is also of extreme importance that the molecules of the compound be present in the recording layer at an increased density. Further, decreased roughness of the recording layer surface will minimize scattering of the light thereby to improve the recording density.

Small surface smoothness of the recording layer is desirable particularly in writing and reading information with an evanescent light because the distance between an evanescent light source and the recording layer should be as small as $1/4$ or less of the wavelength of the light.

However, considerations for recording density improvement from these aspects are not given in JP-A-6-267071. That is, the proposed recording layer contains a binder to secure transparency (amorphous property) in a thin film configuration. As a result, the photochromic compound is about 20-fold diluted only to have a low molar absorptivity ($\epsilon$), which is problematical for practical use.

JP-A-9-241254 discloses a diheteroarylethene compound having an adamantyl group which is represented by formula:

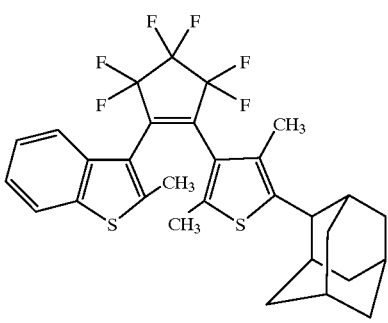

and an optical recording medium containing the same. The disclosure teaches that the compound, when dissolved in a solvent, applied to a substrate and dried, provides an amorphous recording layer without using a binder resin. However, the glass transition point of this compound is as low as 40° C. A recording layer formed of such a compound involves the fear that the pits after recording may change the phase under a high temperature and high humidity condition. It will follow that the signals become unclear, resulting in a failure of accurate read-out.

Jpn. J. Appl. Phys., Part 1, 35(3) (1966) reports a recording medium having a polystyrene resin recording layer containing 20% by weight of a diheteroarylethene compound represented by formula:

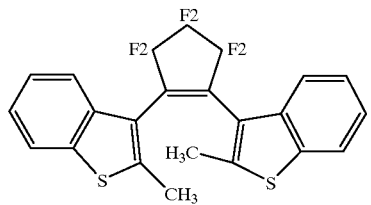

The report also discloses a recording medium having an amorphous thin film as a recording layer which is formed on a glass substrate by vacuum evaporation of a diheteroarylethene compound represented by formula:

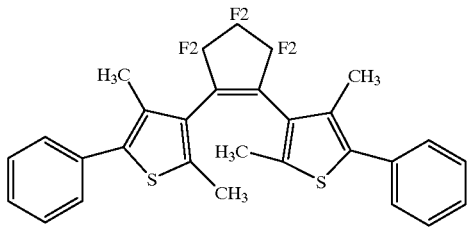

The former recording medium cannot be seen as practical due to the low concentration of the heteroarylethene compound in the recording layer similarly to the one according to JP-A-6-267071. Having a glass transition point of Compound A is 18° C. and that of Compound B is 25° C. the latter diheteroarylethene compound has the same problem as with JP-A-9-241254. Besides, while the deposited film is uniformly amorphous immediately after vacuum evaporation, crystal nuclei appear in a day or two, and gradual crystallization of the film follows. Therefore, these recording media need further improvements for practical use.

An additional number of optical recording media having a recording layer containing a diheteroarylethene compound are found in JP-A-62-273231, JP-A-7-89954, JP-A-9-58188, JP-A-7-173151, etc. The recording layers according to JP-A-7-89954, JP-A-9-58188, and JP-A-7-173151 comprise a binder resin in a large proportion so as to form an amorphous film. Because the diheteroarylethene compound of JP-A-62-273231 is a polymer, the recording layer can be made solely of this compound and yet cannot get rid of the problem of small molar absorptivity.

SUMMARY OF THE INVENTION

An object of the present invention is to provide an optical recording medium which achieves an improved recording density and practically sufficient durability.

Another object of the invention is to provide an optically recording method using such a recording medium.

The present invention provides a near-field optical recording medium having a recording layer capable of writing, reading and erasing information using an evanescent light having a beam spot size smaller than the wavelength of a source light, wherein the recording layer is a stable amorphous layer mainly comprising a photochromic compound having a glass transition point of 55° C. or higher and a molecular weight of 3000 or less.

The present invention also provides a near-field optical recording method which comprises previously irradiating the entire surface of a recording layer with ultraviolet rays, the recording layer being a stable amorphous layer mainly comprising a photochromic compound having a glass transition point of 55° C. or higher and a molecular weight of 3000 or less, to convert the photochromic compound to a ring-closed compound and then ring-opening the ring-closed compound with an evanescent light having a beam spot size smaller than the wavelength of a source light thereby to record signals.

The near-field optical recording medium according to the present invention is characterized in that it is capable of writing, reading and erasion with an evanescent light; that the recording layer is an amorphous layer mainly comprising a photochromic compound having a relatively high glass transition point (55° C. or higher) and a low molecular weight (3000 or less); and that the amorphous recording layer is stable for an extended period of time.

The fact that the main component of the recording layer is a low-molecular photochromic compound whose molecular weight is not more than 3000 achieves an increased concentration of the photochromic moiety in the recording layer, which leads to an increased molar absorptivity. As a result, the optical recording medium has an increased C/N ratio.

Being amorphous, the recording layer exhibits small surface roughness with no surface unevenness attributed to crystals of the photochromic compound. Thus, irradiating light is prevented from scattering, and anisotropy caused by crystals is eliminated. As a result, optical recording at a small spot diameter is feasible.

With the photochromic compound having a glass transition point of 55° C. or higher, it is considered that the recorded signals are prevented from being deteriorated under usually experienced conditions of use. A preferred glass transition point of the photochromic compound is 60° C. or higher.

The term "stable" as used for an amorphous layer as referred to in the present invention means that no crystal nuclei is found in any 1 cm$^2$ area of the recording layer under a polarizing microscope after the recording layer is allowed to stand at room temperature for 240 hours from film formation. In Test Examples hereinafter given, a recording layer was observed under a polarizing microscope after being allowed to stand at room temperature for 240 hours (10 days), and a layer which revealed no crystal nuclei whichever area of 1 cm² was chosen was judged to be a stable amorphous layer.

The recording layer of the near-field optical recording medium of the invention mainly comprises a specific photochromic compound. The term "mainly" as used herein is intended to mean that about 80% by weight or more, preferably 90% by weight or more, of the recording layer is the photochromic compound. It is the most preferred that the recording layer be made substantially solely of the photochromic compound. While components which can generally be used in the recording layer in combination with a photochromic compound include various additives, other coloring matter, and binders (hereinafter described), it is advisable to use no other components than the photochromic compound for increasing the photochromic compound concentration to improve molar absorptivity ($\epsilon$).

BRIEF DESCRIPTION OF THE DRAWINGS

FIG. 7b is an enlarged micrograph of FIG. 7a.

DETAILED DESCRIPTION OF THE INVENTION

Figure 1:
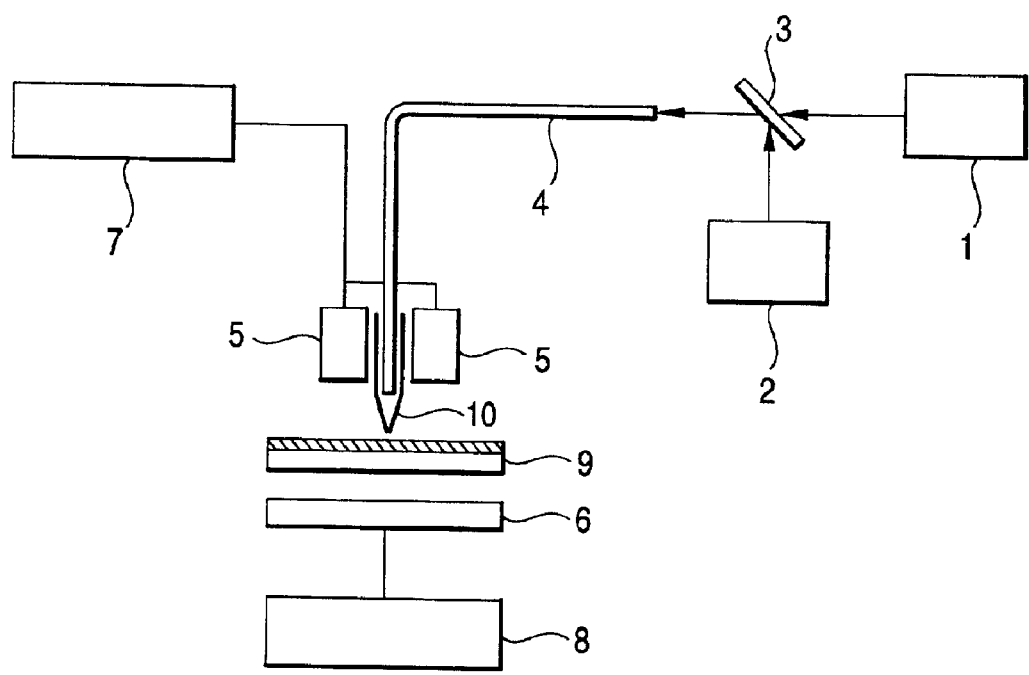
FIG. 1 is a schematic illustration of a system for writing, reading and erasion which is suitably used in the present invention.

The photochromic compound which can be used in the present invention has a glass transition point of 55° C. or higher and a molecular weight of 3000 or less and is capable of forming a stable amorphous layer. It is not structurally limited as long as these requirements are fulfilled. Such photochromic compounds include diarylethene compounds. Inter alia, those having a pyrrole ring, a thiophene ring, a furan ring or a selenophene ring in the heteroaryl moiety thereof are preferred.

Particularly preferred diheteroarylethene compounds are represented by formula (I):

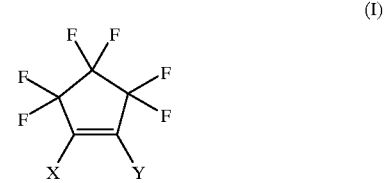

(I)

wherein X and Y each independently represents a partial structure represented by formula (a) or (b):

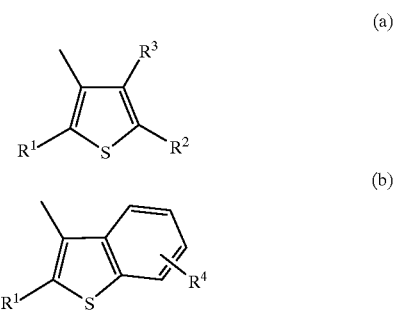

(a)

(b)

wherein $R^1$ represents a substituted or unsubstituted alkyl group or a substituted or unsubstituted alkoxy group; $R^2$ represents a substituted or unsubstituted alkyl group, a substituted or unsubstituted alkoxy group, a substituted or unsubstituted alkylthio group, a substituted or unsubstituted aromatic group, or a substituted or unsubstituted aromatic heterocyclic group; $R^3$ represents a hydrogen atom, a substituted or unsubstituted alkyl group or a substituted or unsubstituted alkoxy group; and $R^4$ represents a hydrogen atom, a substituted or unsubstituted alkyl group, a substituted or unsubstituted alkenyl group, a substituted or unsubstituted alkoxy group, a substituted or unsubstituted alkylthio group, a substituted or unsubstituted aromatic group, a substituted or unsubstituted aromatic heterocyclic group, a substituted or unsubstituted aryloxy group, a substituted or unsubstituted arylthio group, a substituted or unsubstituted heteroaryloxy group or a substituted or unsubstituted heteroarylthio group; provided that when X and Y both represent the structure (b), two $R^4$'s do not simultaneously represent a hydrogen atom.

The acyclic "alkyl group", "alkoxy group", and "alkylthio group" as recited hereunder as substituents may be either straight-chain or branched.

In the structures (a) and (b), specific examples of the group represented by $R^1$ are substituted or unsubstituted alkyl groups having 1 to 4 carbon atoms, such as methyl, ethyl, propyl, and butyl; and substituted or unsubstituted alkoxy group having 1 to 4 carbon atoms, such as methoxy, ethoxy, propoxy, and butoxy. Substituents of the "substituted" alkyl or alkoxy group include a halogen atom, e.g., fluorine or chlorine, and an alkoxy group having 1 to 6 carbon atoms. $R^1$ preferably represents an acyclic alkyl group having 1 to 3 carbon atoms or an acyclic alkoxy group having 1 to 3 carbon atoms.

The group represented by $R^2$ includes an acyclic or cyclic and substituted or unsubstituted alkyl group having 1 to 20 carbon atoms, such as methyl, ethyl, propyl, butyl, octyl, decyl and cyclohexyl; an acyclic or cyclic and substituted or unsubstituted alkoxy group having 1 to 20 carbon atoms, such as methoxy, ethoxy, propoxy, butoxy, octyloxy, decyloxy and cyclohexyloxy; an acyclic or cyclic and substituted or unsubstituted alkylthio group having 1 to 20 carbon atoms, such as methylthio, ethylthio, propylthio, butylthio, octylthio, decylthio and cyclohexylthio; and a substituted or unsubstituted aromatic group (inclusive of an aromatic heterocyclic group) having 1 to 20 carbon atoms, such as a 2-thiophenyl group or a 2-furanyl group that are 5-membered cyclic groups having 4 carbon atoms, a phenyl group or a naphthyl group. Substituents of the "substituted" non-aromatic groups include a halogen atom, e.g., fluorine or chlorine, and an alkoxy group having 1 to 6 carbon atoms. Substituents of the "substituted" aromatic groups will be specified with respect to a partial structure (a') hereinafter described. $R^2$ preferably represents a substituted or unsubstituted aromatic group (inclusive of an aromatic heterocyclic group).

The group represented by $R^3$ includes a hydrogen atom; an acyclic or cyclic and substituted or unsubstituted alkyl group having 1 to 10 carbon atoms, such as methyl, ethyl, propyl, butyl, t-amyl and t-hexyl; and an acyclic or cyclic and substituted or unsubstituted alkoxy group having 1 to 10 carbon atoms, such as methoxy, ethoxy, butoxy and t-hexyloxy. Substituents of the "substituted" alkyl or alkoxy group include a halogen atom, e.g., fluorine or chlorine, and an alkoxy group having 1 to 6 carbon atoms. $R^3$ preferably represents an acyclic alkyl group having 1 to 3 carbon atoms or an acyclic alkoxy group having 1 to 3 carbon atoms.

The group represented by $R^4$ includes a hydrogen atom; a cyclic alkyl group having 4 to 8 carbon atoms or an acyclic alkyl group carrying a tertiary or quaternary carbon atom and having 4 to 8 carbon atoms, such as t-butyl, t-amyl, t-hexyl or cyclohexyl; an alkyl group having 1 to 10 carbon atoms which is substituted with a fluorine atom and/or a phenyl group, such as trifluoromethyl, tetrafluoroethyl, perfluoroethyl, perfluoropropyl or di(trifluoromethyl)phenylmethyl; an alkenyl group having 4 to 8 carbon atoms, such as vinyl, methylvinyl or methylethylvinyl; an alkenyl group having 2 to 15 atoms which is substituted with a fluorine atom and/or a phenyl group, such as trifluoromethyldiphenylvinyl or diphenylvinyl; an alkoxy group carrying a tertiary or quaternary carbon atom and having 4 to 8 carbon atoms, such as t-butoxy, t-amyloxy or t-hexyloxy; an alkoxy group having 1 to 15 carbon atoms which is substituted with a fluorine atom and/or a phenyl group, such as trifluoromethoxy, tetrafluoroethoxy, perfluoroethoxy, perfluoropropyl or di(trifluoromethyl)phenylmethoxy; an alkylthio group carrying a tertiary or quaternary carbon atom and having 4 to 8 carbon atoms, such as t-butylthio, t-amylthio or t-hexylthio; an alkylthio group having 1 to 10 carbon atoms which is substituted with a fluorine atom and/or a phenyl group, such as trifluoromethylthio, tetrafluoroethylthio, pentafluoroethylthio, perfluoropropylthio or di(trifluoromethyl)phenylmethylthio; a substituted or unsubstituted aromatic group, such as phenyl, naphthyl; a substituted or unsubstituted aromatic heterocyclic group, such as thiofuranyl or indolyl; a substituted or unsubstituted aryloxy group, such as phenoxy or naphthoxy; a substituted or unsubstituted heteroaryloxy group, such as thiopheneoxy or indoleoxy; and a substituted or unsubstituted heteroarylthio group, such as thiophenethio or indolethio. Substituents of the "substituted" aromatic groups (including heterocyclic groups), (hetero)aryloxy groups, and (hetero)arylthio groups include halogen atoms, e.g., fluorine and chlorine; alkyl groups having 1 to 6 carbon atoms; and alkoxy groups having 1 to 6 carbon atoms.

The partial structure (a) is preferably a partial structure (a'):

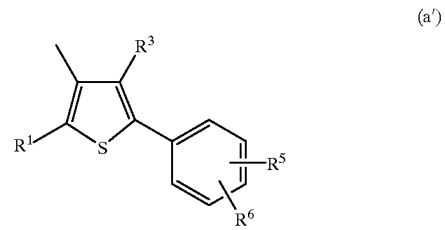

wherein $R^1$ and $R^3$ are as defined above; and $R^5$ and $R^6$ each independently represents a hydrogen atom, a substituted or unsubstituted alkyl group, a substituted or unsubstituted alkenyl group, a substituted or unsubstituted alkoxy group, a substituted or unsubstituted alkylthio group, a substituted or unsubstituted aromatic group (inclusive of an aromatic heterocyclic group), a substituted or unsubstituted aryloxy group, a substituted or unsubstituted arylthio group, a substituted or unsubstituted heteroaryloxy group or a substituted or unsubstituted heteroarylthio group.

In the structure (a'), $R^5$ and $R^6$ can represent any of the groups recited as $R^4$. Where either one of $R^5$ and $R^6$ is a hydrogen atom, the other is preferably at the p-position with respect to the thiophene ring. Where neither $R^5$ nor $R^6$ is a hydrogen atom, either one of them is preferably at the p-position with respect to the thiophene ring.

Particularly preferred of the diheteroarylethene compounds represented by formula (I) are one in which both X and Y represent the partial structure (b), one in which X is the structure (a') and Y is the structure (b) (provided that $R^4$, $R^5$ and $R^6$ in a molecule do not simultaneously represent a hydrogen atom), and one in which both X and Y represent the partial structure (a') (provided that not all of $R^5$'s and $R^6$'s in a molecule represent a hydrogen atom).

The diheteroarylethene compound for use in the invention has a glass transition point of 55° C. or higher, preferably 60° C. or higher. The upper limit of the glass transition point of the present diheteroarylethene compound is preferably 110° C. or lower. Further, the compound is required to be capable of providing such a layer that maintains an amorphous state stably for a long period of time. To satisfy these requirements, it is preferred that the compound of formula (I) have the partial structure (a') and/or (b) and that at least one of (1) $R^5$ or $R^6$ in the partial structure (a') and (2) $R^4$ in the partial structure (b) be a relatively bulky group.

It should be noted, however, that not all the compounds having a bulky group as $R^5$ or $R^6$ and/or $R^4$ are preferred. That is, compounds having too high a molecular weight are to result in a low density of the photochromic moiety in the recording layer and tend to have a reduced glass transition point, which are unfavorable for use in the optical recording medium. This is the reason the upper limit of the molecular weight of the compound is 3000. A preferred upper limit of the molecular weight is 2000.

From the above consideration, it is particularly preferred that $R^4$, $R^5$ and $R^6$ be a hydrogen atom or a group selected from the following. Note that not all of $R^4$, $R^5$ and $R^6$ in a molecule do not represent a hydrogen atom.
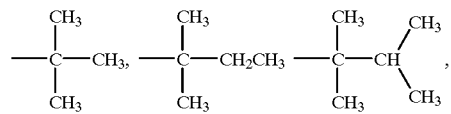
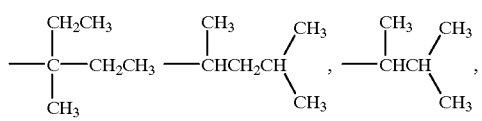
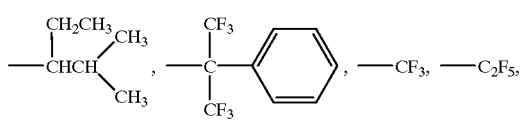
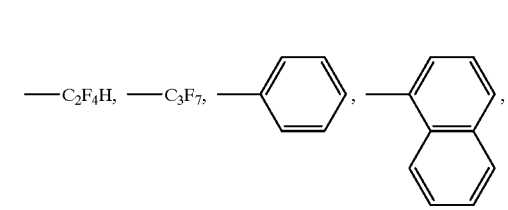
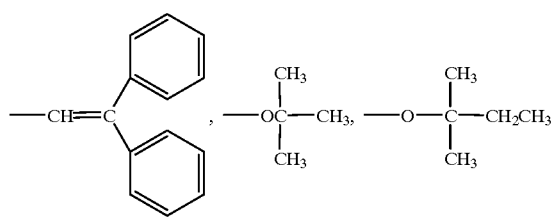
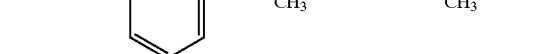
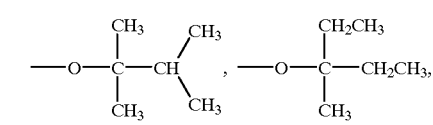
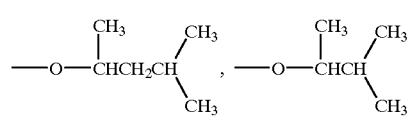
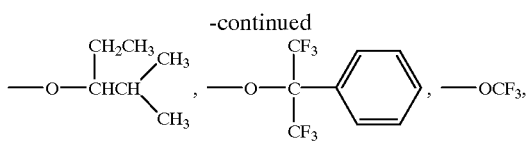
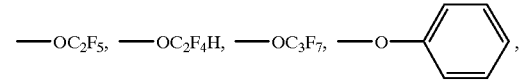
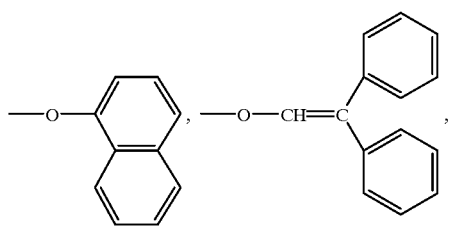
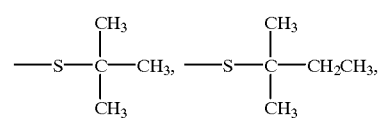
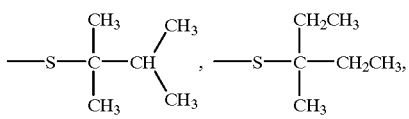
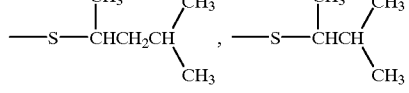
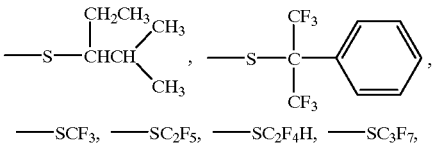
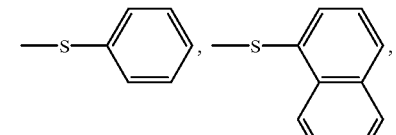
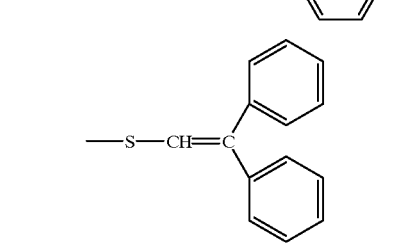
Specific examples of the diheteroarylethene compounds which can be used in the invention include compounds (A) to (M) shown below.

(A)
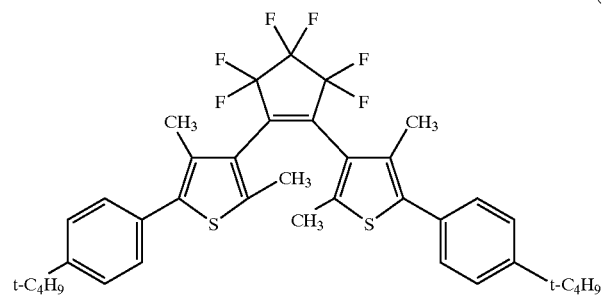
(B)
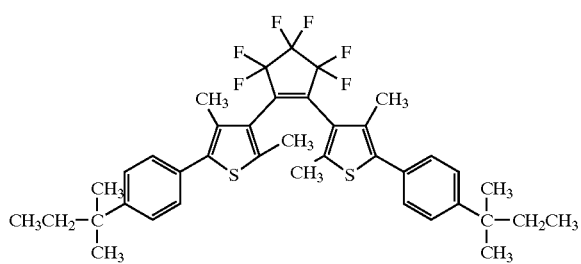
(C)
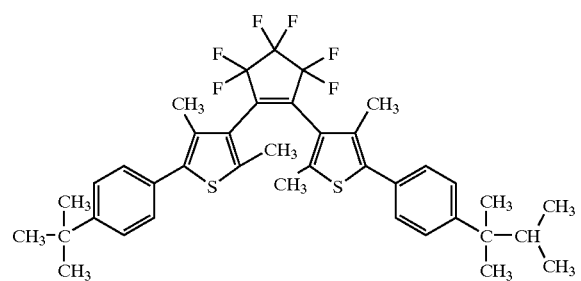
(D)
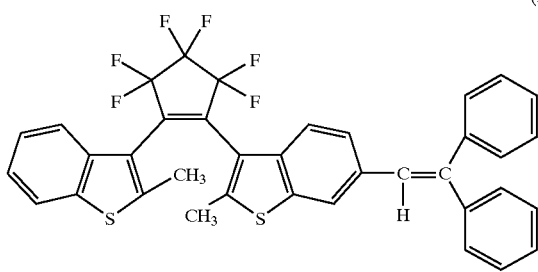
(E)
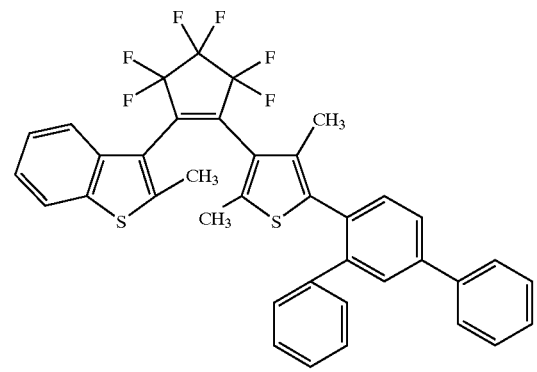
(F)
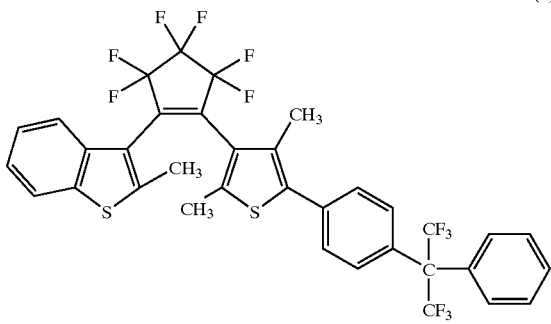
(G)
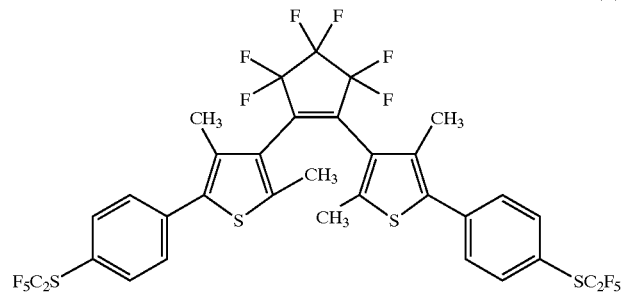
(H)
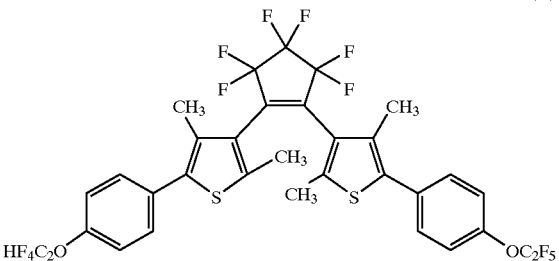
(I)
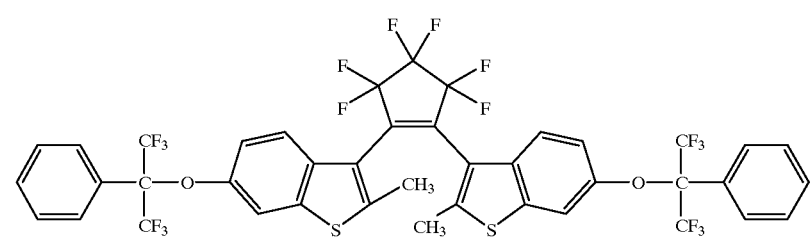

-continued (J)
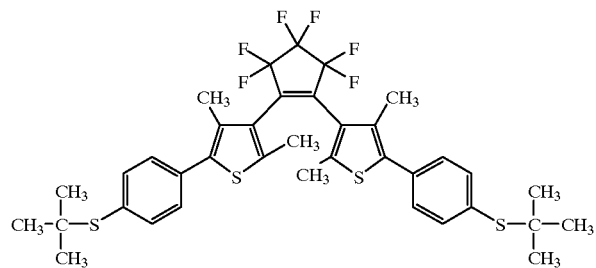

(K)
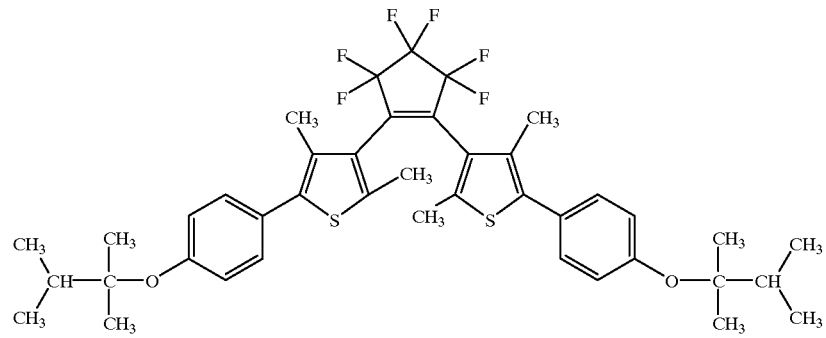

(L)
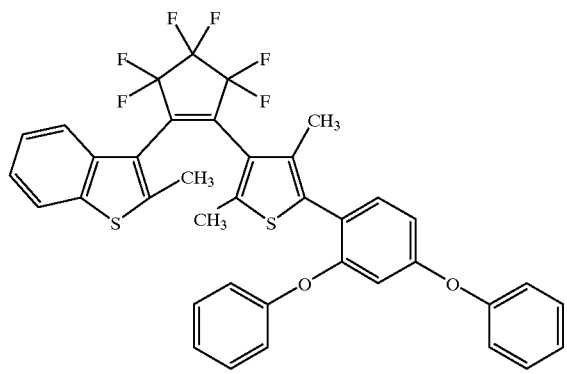

(M)
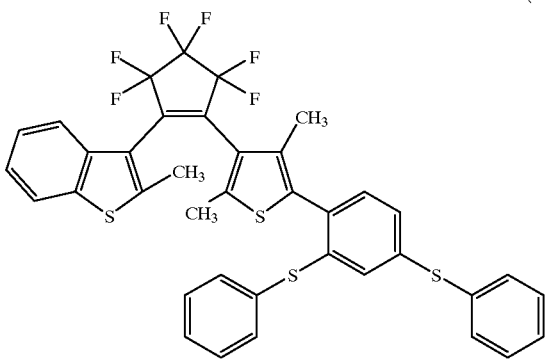

In the present invention, a photochromic compound, such as the above-described diheteroarylethene compound, is used to form an amorphous recording layer on a substrate.

Where a recording layer is amorphous, it is transparent. In other words, if a recording layer has a crystallized portion, it is to have an opaque portion. This can be confirmed more accurately on an X-ray diffraction pattern of a recording layer. If a recording layer is uniformly amorphous, i.e., if the photochromic compound constituting the recording layer is not crystallized, there is no long range order, and only short range order will be observed. The power X-ray diffraction pattern of an amorphous recording layer as stripped off an optical recording medium ought to show a broad halo pattern ascribed to scattering of incident X-rays.

In actual use as an optical recording medium, the amorphous state of the recording layer should be stable for a long time. The optical recording media currently available are required to store the recorded information for several tens to about a hundred years. The optical recording medium of the present invention retains the amorphous state for at least 10 days (240 hours or longer) at room temperature from the recording layer formation, which is more advantageous for practical application compared with conventional optical recording media using a photochromic compound.

In the production of the near-field optical recording medium of the invention, the method of forming the amorphous recording layer is not particularly limited. In general, a coating method, a vacuum evaporation method, and the like are adopted.

In a coating method, a photochromic compound, such as the above-described diheteroarylethene compound, is dissolved or dispersed in a solvent, such as carbon tetrachloride, benzene, cyclohexane, methyl ethyl ketone, and tetrachloroethane, and the solution or dispersion is applied to a substrate by bar coating, roll coating, spin coating or a like coating technique to form a film.

It is desirable to use substantially no binder resin. An advisable amount of a binder resin, if used, is not more than 5% by weight based on the photochromic compound. As stated previously, the diheteroarylethene compound which is a suitable compound in the invention is characterized by capability of forming an amorphous recording layer with substantially no aid of a binder resin. To use no binder resin results in a high concentration of the photochromic compound, which makes high-density recording feasible.

Binder resins which can be used if desired include polyester resins, polystyrene resins, polyvinylbutyral resins, polyvinylidene chloride, polyvinyl chloride, polymethyl methacrylate, polyvinyl acetate, cellulose acetate, epoxy resins, and phenolic resins.

While the recording layer may contain, in addition to the photochromic compound, a binder resin and other arbitrary components such as additives and coloring matter as noted above, it is desirable that the total content of the binder resin and various additives be not more than 20% by weight, preferably not more than 10% by weight, particularly preferably substantial zero, based on the recording layer.

The recording layer of the near-field optical recording medium of the invention has an optical density (OD) of 0.4 or more, preferably 0.6 or more, per 100 nm thickness.

The near-field optical recording medium of the invention comprises at least a substrate and the above-described recording layer. The substrate may be either transparent or non-transparent to light for writing and/or reading. The substrate may be non-transparent unless writing and reading are conducted from the substrate side. Materials of the substrate include those commonly employed in general recording materials, such as glass, synthetic resins, paper, and metal sheets or foils. Synthetic resin substrates are suitable from various aspects. Suitable resins include acrylic resins, methacrylic resins, vinyl acetate resins, vinyl chloride resins, nitrocellulose, polyethylene resins, polypropylene resins, polycarbonate resins, polyimide resins, and polysulfone resins.

The recording layer preferably has a thickness of 0.05 to 1 $\mu$m, particularly 0.1 to 0.6 $\mu$m.

If necessary, the optical recording medium of the invention may have additional layers, such as a reflective layer, a primer layer, and a protective layer, provided on the substrate and may also have additional layers, such as a reflective layer and a protective layer, provided on the recording layer. The layer structure and the order of layers are not particularly limited and designed appropriately depending on the writing and/or reading conditions of the recording medium.

Being amorphous, the recording layer of the optical recording medium of the invention has an extremely small surface roughness. Seeing that near-field light is used for writing and reading, it is preferred for the recording layer to have a surface roughness (Ra) of 3 nm or smaller, particularly 1 nm or smaller.

The distance between an evanescent light generating source and the surface of the recording medium is about several hundreds of nanometers in near-field optical recording, the surface roughness on the recording medium surface is preferably 100 nm or smaller.

The near-field optical recording method according to a first aspect of the present invention is characterized by using the above-described optical recording medium and comprises: irradiating the entire surface of a recording layer of the optical recording medium with an ultraviolet ray in advance so as to convert the photochromic compound of the recording layer to a ring-closed compound; and then ring-opening the ring-closed compound with an evanescent light having a beam spot diameter smaller than the wavelength of a source light, the source light having a visible light wavelength to promote a ring-opening reaction of the compound, thereby to record signals.

The near-field optical recording method according to a second aspect of the present invention, in which the light irradiation order is reverse to that of the first aspect of the invention, is characterized by using the above-described optical recording medium and comprises: irradiating the entire surface of a recording layer of the optical recording medium with a visible light in advance so as to convert the photochromic compound of the recording layer to a ring-opened compound; and then ring-closing the ring-opened compound with an evanescent light having a beam spot diameter smaller than the wavelength of a source light, the source light having an ultraviolet ray wavelength to promote a ring-closing reaction of the compound, thereby to record signals.

The near-field optical recording method according to the first aspect of the present invention will be described in more detail with reference to FIG. 1. FIG. 1 schematically illustrates a system for writing, reading and erasing data which is suitable to carry out the optical recording method of the invention.

An evanescent light having a spot diameter smaller than the wavelength is obtainable by (1) introducing He—Ne laser light 1, Ar laser light 2 or semiconductor laser light having been treated through a half mirror 3 into a capillary 10 for a microelectrode (a capillary having an aperture smaller than the wavelength, e.g., 0.5 $\mu$m or less, preferably 0.2 $\mu$m or less, still preferably 0.1 $\mu$m or less) through a glass fiber 4 or (2) fabricating an electroluminescent device in the capillary 10 for a microelectrode.

The principle of a photon scanning tunneling microscope (STM) is utilized to effect writing, reading (reproducing) and erasion of information. Specifically, the capillary 10 is fitted in an electrostrictive device 5 and brought close (usually at a distance of 0.1 $\mu$m or smaller) to a recording medium 9 along the Z-axis by means of a position control circuit 7. Then the recording medium 9 is scanned with the capillary along the X- and Y-axes while turning the light source on and off in conformity to input information to conduct recording. The recording operation induces a change of the recording medium 9 in absorbance.

The recorded information is read out as follows according to the first aspect of the present invention. The same light source as used for writing is used, or light source for reading may be obtained by introducing light of different wavelength from that used for recording into the same capillary 10. Reflected light from the recording surface (in this case a reflective film is provided beneath the recording layer) or transmitted light is detected with a photoelectric device 6 which is placed in front of or in the rear of the recording medium 9 while modulating the intensity or the position (in the Z-axis direction) of the reading light. The light may be detected directly without such modulation. The recorded pits having had the absorbance changed, the difference between recorded pits and non-recorded pits in reflected or transmitted light intensity is detected to read out the recorded information. Numeral 8 in FIG. 1 is an output signal processing circuit.

Erasion of recorded information according to the first aspect of the invention is conducted by irradiation with ultraviolet light.

The near-field optical recording method according to the second aspect of the present invention may be in accordance with that according to the first aspect of the present invention. The same apparatus as in the first aspect of the invention can be used for recording signals, for example, by replacing the light source like the He—Ne laser light 1 or Ar laser light 2, etc. in FIG. 1 with GaN laser light, etc., and by introducing this light through a half mirror 3 or through a glass fiber 4 without the half mirror.

The reading according to the second aspect of the present invention may be carried out in the same manner as in the first aspect of the present invention.

Erasion of recorded information according to the second aspect of the present invention is conducted by irradiation, for example, with He—Ne laser light or Ar laser light.

As described above, the recording method of the invention uses a photochromic compound as a recording material and an evanescent light having a beam spot diameter smaller than the wavelength of a source light as light for writing, reading and erasing information. Therefore, use of a beam spot having a diameter of 0.1 μm will achieve 100 times as high a recording density as with the state-of-the-art optical recording method, and use of a beam spot having a diameter of 0.01 μm will achieve 10,000 times as high a recording density as with the state-of-the-art optical recording method. Moreover, since the recording layer is an amorphous layer mainly comprising a photochromic compound, it has a high photochromic compound concentration and a very small surface roughness, with which high-density recording is feasible.

While the invention has been described in detail and with reference to specific examples thereof, it will be apparent to one skilled in the art that various changes and modifications can be made therein without departing from the spirit and scope thereof.

This application is based on a Japanese patent application JP 11-064406, filed Mar. 11, 1999, and a PCT application PCT/JP00/01404, filed Mar. 8, 2000, the entire contents of each of which are hereby incorporated by reference, the same as if set forth at length.

The present invention will now be illustrated in greater detail with reference to Preparation Examples, Examples, Comparative Examples, Test Examples, and Comparative Test Examples, but it should be understood that the invention is not construed as being limited thereto.

PREPARATION EXAMPLE 1

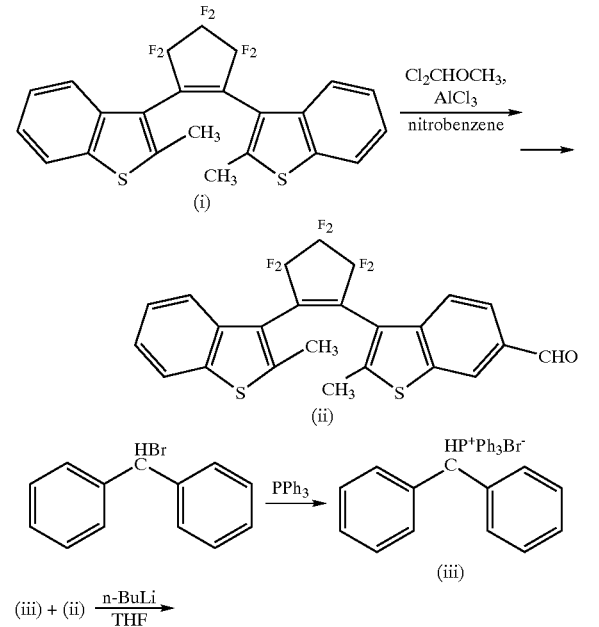

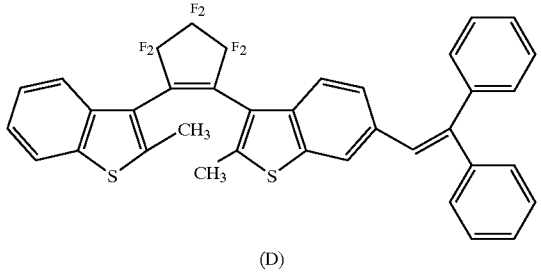

(D)

To 1.4 g (2.99 mmol) of compound (i) was added 15 ml of nitrobenzene, the mixture cooled with ice-water, and 0.3 ml (3 mmol) of Cl$_2$CHOCH$_3$O added thereto. To the mixture was added 403 mg (3 mmol) of ground AlCl$_3$. The mixture was extracted with chloroform. The extract was purified by column chromatography (eluent: hexane/chloroform=1:1) to give compound (ii) in a yield of 70%.

In 250 ml of benzene were dissolved 27.4 g (100 mmol) of bromidiphenylmethane and 28.8 g (110 mmol) of triphenylphosphine, and the mixture was heated under reflux for 16 hours. After allowing the reaction mixture to cool, the precipitate was collected by filtration to give compound (iii) as a white solid. The reaction yield was 30%.

In tetrahydrofuran was dissolved 1.06 g (2.09 mmol) of compound (iii), and 1.3 ml (2.09 mmol) of n-butyl lithium was added dropwise to the solution at 0° C. in an argon gas atmosphere. After the mixture was stirred for 20 minutes, 1 g (2.02 mmol) of compound (ii) was added thereto, followed by stirring at room temperature for 24 hours. The reaction mixture was extracted with diethyl ether, and the extract was purified by column chromatography (eluent: chloroform) to give compound (D).

EXAMPLE 1

A 100 mg/10 ml hexane solution of compound (D) below prepared in Preparation Example 1 (glass transition point: 75° C.) was dropped and spread on a glass substrate by spin coating at 1000 rpm for 5 minutes and then at 3000 rpm for 10 seconds to form an amorphous recording layer having a film thickness of 350 nm.

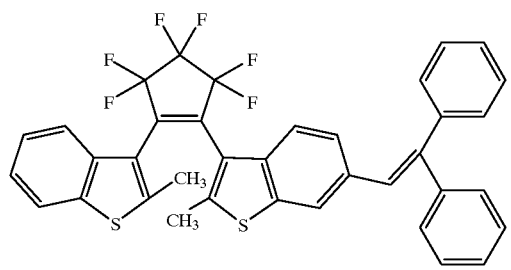

The optical density (OD) of the recording layer per 100 nm thickness was 0.7. The surface roughness (Ra) of the recording layer was 1 nm or smaller as measured with an atomic force microscope (AFM) or a scanning tunneling microscope (STM). The recording layer was totally transparent.

The entire surface of the recording layer was irradiated with ultraviolet light (366 nm) to make it blue. The recording medium was set on a near-field scanning optical microscope (NSOM) (TMX2100 Aurora, manufactured by Topometrix Corporation), and a beam having a wavelength of 632.8 nm from an He—Ne laser was applied to the recording layer for 1 minute. Then the entire surface was scanned with the laser light having the intensity modulated to 1/20. As a result, it was confirmed that spots having a diameter of about 80 nm had been recorded. These recorded spots were erased by irradiation with ultraviolet light (366 nm).

Storage Stability Test:

The optical recording medium was maintained at 80° C. and 85% RH for 200 hours. Thereafter, spots were recorded, read out, and erased in the same manner as described above. As a result, the signal spots were detected normally and were erased as well.

EXAMPLE 2

Compound (A) (bis(2,4-dimethyl-5-(4-t-butyl)phenylthiophen-3-yl)perfluorocyclopentene; glass transition point: 70° C.) having the formula shown below was synthesized in accordance with the process described in Preparation Example 1.

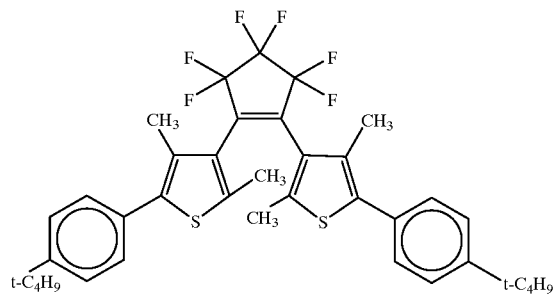

A 350 nm thick amorphous recording layer was formed on a glass substrate by using compound (A) in the same manner as in Example 1. The OD of the recording layer per 100 nm thickness was 0.65. The surface roughness (Ra) of the recording layer was 1 nm or smaller as measured with an AFM or an STM. The recording layer was totally transparent.

Figure 2A:
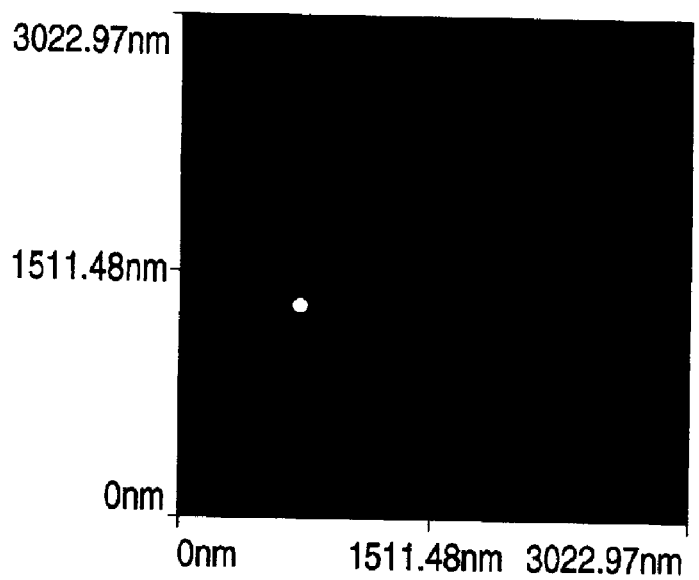
FIG. 2 is optical images of a recorded spot(s) in Example 1, taken under a near-field scanning optical microscope.
Figure 2B:
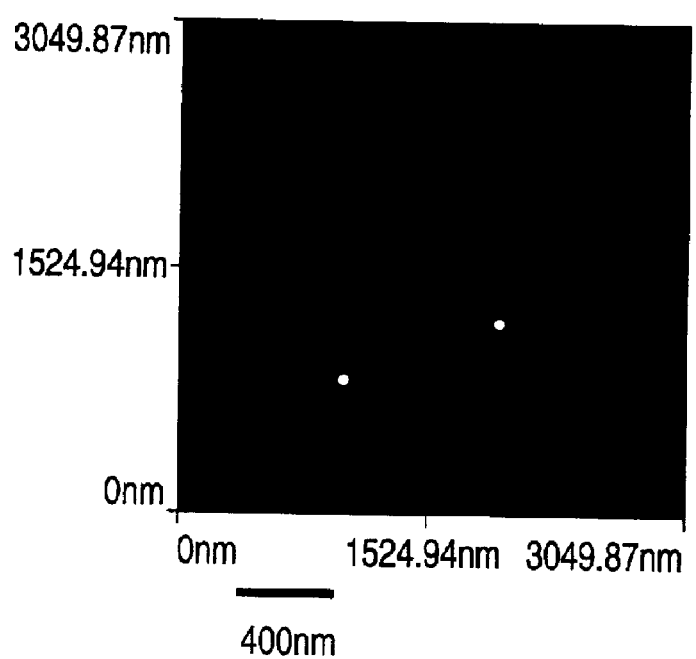

A spot was written on the recording medium, read out, and erased in the same manner as in Example 1. It was confirmed that a spot having a diameter of about 80 nm had been recorded as shown in FIG. 2A. Another spot was written on a different site and read out in the same manner. As a result, a second fine spot having a diameter of about 80 nm was recorded as shown in FIG. 2B. These recorded spots were erased on ultraviolet (366 nm) irradiation.

When the optical recording medium was subjected to the same storage stability test under a high temperature and high humidity condition in the same manner as in Example 1, signal spots were detected normally and erased as well.

COMPARATIVE EXAMPLE 1

A recording layer was formed on a glass substrate in the same manner as in Example 1, except for replacing compound (D) with a photochromic compound represented by the following structural formula (glass transition point: 40° C.; disclosed in JP-A-9-241254).

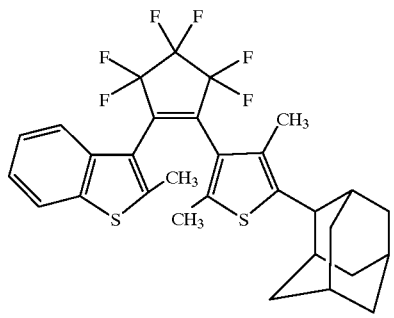

The recording layer formed was amorphous but had as low an OD as 0.035 per 100 nm thickness, which was 1/20 of that of Example 1.

The resulting optical recording medium showed low sensitivity when optical recording was carried out in the same manner as in Example 1. Although it was confirmed that spots having a diameter of about 80 nm had been recorded, the recorded spots underwent deformation when subjected to the same storage stability test as in Example 1 and were no more detected normally.

In Test Examples hereinafter given, the compounds used in Examples 1 and 2 and other diheteroarylethene compounds that have been proposed for application to an optical recording medium were reviewed for capability of forming a stable amorphous thin film and stability of the amorphous state. An amorphous thin film can be prepared by, for example, (1) spin coating with a solution of the compound, (2) heating the compound at or above the melting point and rapidly cooling the melt or (3) vacuum evaporation. Such physical properties as a glass transition point of the resulting film do not depend on the film forming method of choice.

The property of forming an amorphous thin film of the compounds (1) through (9) shown below were evaluated by allowing the film formed of the compound to stand at room temperature and observing the film under a polarizing microscope through parallel or crossed polarizers (i.e., a polarizer and an analyzer) to see (a) whether a clear crystal nucleus appeared and (b) whether a bright spot is observed under crossed nicols. A compound capable of forming a thin film which showed neither a crystal nucleus nor a bright spot was judged capable of forming a stable amorphous thin film.

FIGS. 3 to 12 are micrographs taken under a polarizing microscope, in which the bright ones (whitish ones) are those taken through parallel polarizers (polarizer and analyzer), and the dark ones (blackish ones) are those taken through crossed polarizers (i.e., in crossed nicols).

Compound (1) (= compound (D)):
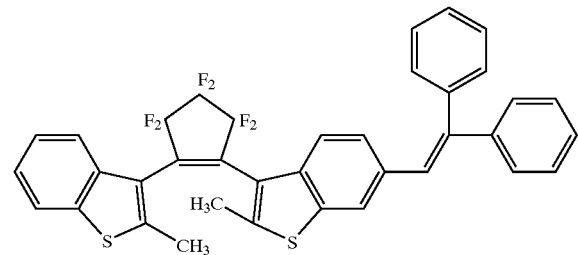
Compound (2) (= compound (A)):
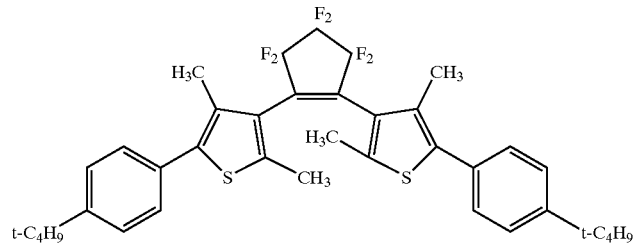
Compound (3):
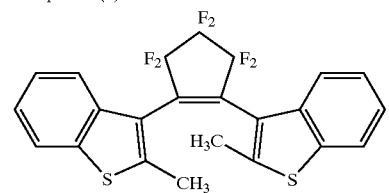
Compound (4):
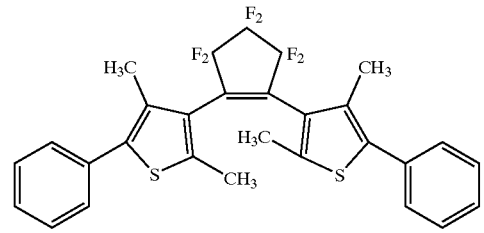
Compound (5):
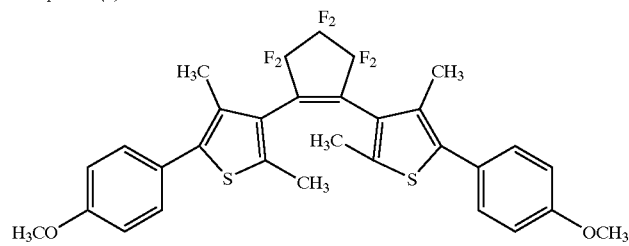
Compound (6):
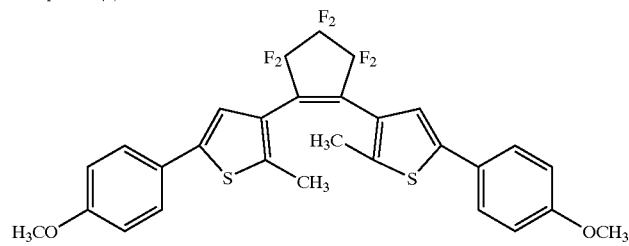

Compound (7):

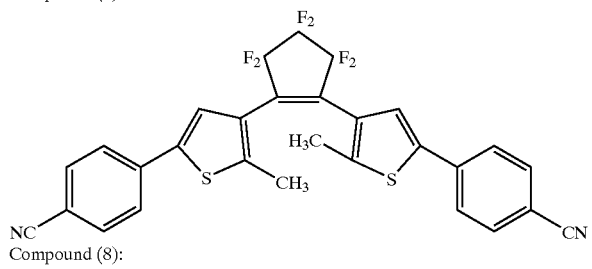

Compound (8):

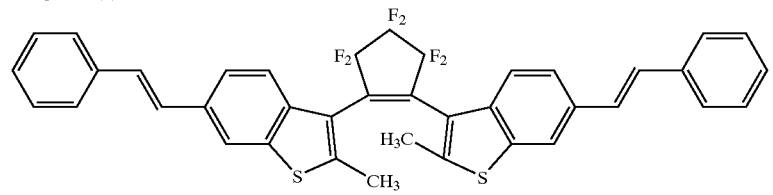

Compound (9):

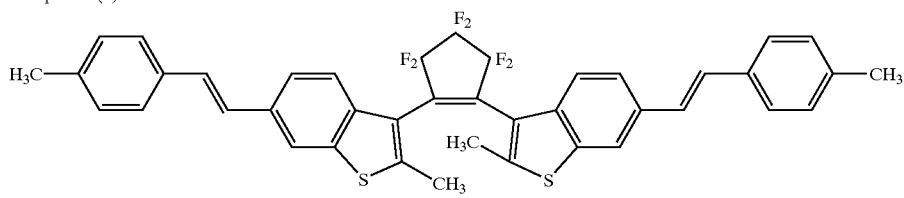

TEST EXAMPLE 1

In 0.5 ml of toluene was dissolved 5 mg of compound (D) used in Example 1. Two 600 nm-thick films of the compound were prepared from the solution by spin coating at 2500 rpm. When those films were examined under a polarizing microscope, no bright spots under cross nicols were observed and no nucleation was confirmed, even after 10 days as well as immediately after film formation.

TEST EXAMPLE 2

Powder (2 mg) of compound (A) used in Example 2 was placed on a glass substrate and melted by heating to 100° C. on a hot plate and rapidly cooled to form a glassy solid drop. When this solid drop was examined under a polarizing microscope, no bright spots under cross nicols were observed and no nucleation was confirmed, even after 10 days.

COMPARATIVE TEST EXAMPLE 1

Figure 3:
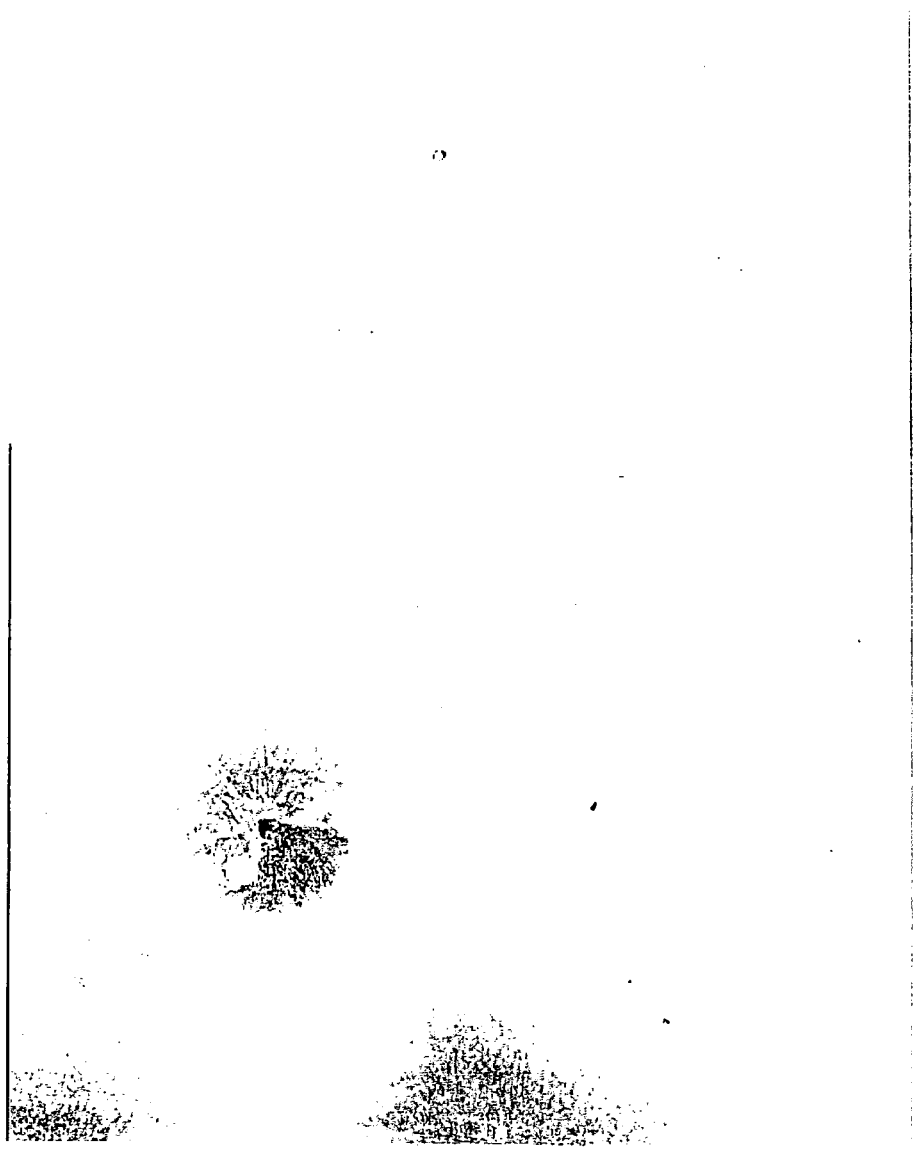
FIG. 3 is a micrograph taken of the film of Comparative Test Example 1 after 19-hour standing under a polarizing microscope in parallel polarizers (i.e., polarizer and analyzer).

Powder (5 mg) of compound (3) was placed on a glass substrate and melted by heating to 200° C. on a hot plate and rapidly cooled, whereupon a colorless transparent thin film was formed. A micrograph of the film taken under a polarizing microscope after 19-hour standing is shown in FIG. 3. Although no crystal nuclei were observed immediately after film formation, the micrograph taken after 19 hours (FIG. 3) clearly displays crystal nuclei. It has now been proved that compound (3) does not have the property of forming a stable amorphous thin film.

COMPARATIVE TEST EXAMPLE 2

Figure 4:
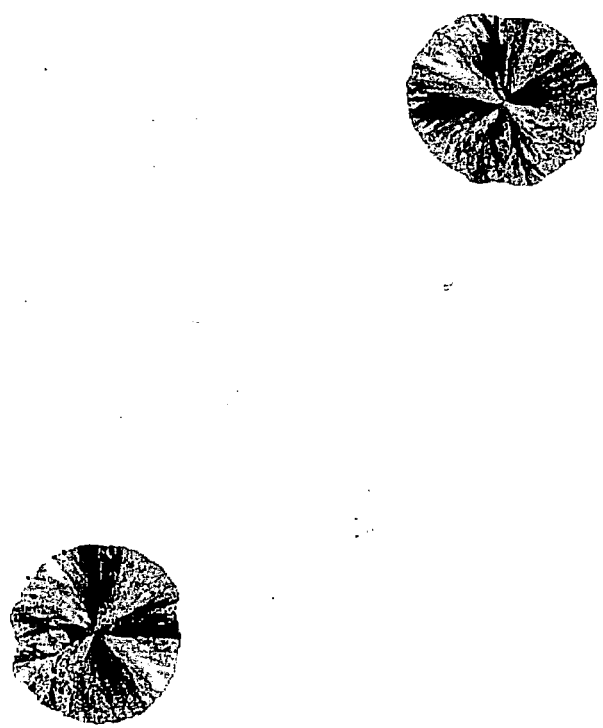
FIG. 4 is a micrograph taken of the film of Comparative Test Example 2 after 50-hour standing under a polarizing microscope in parallel polarizers.
Figure 5:
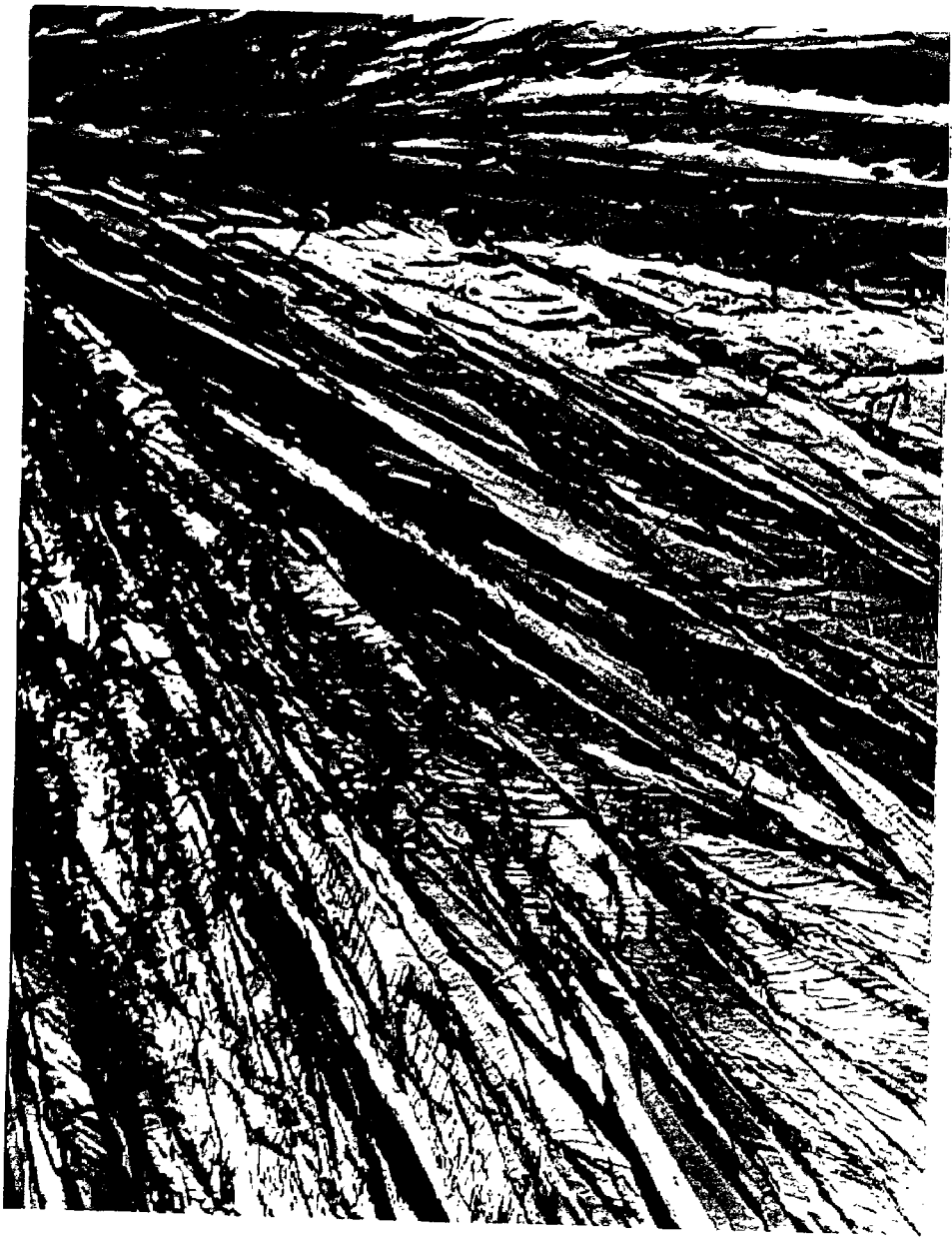
FIG. 5 is a micrograph taken of the film of Comparative Test Example 3 immediately after formation under a polarizing microscope in parallel polarizers.

A thin film of compound (4) was formed on a glass substrate by means of a vacuum evaporation system. The deposited thin film was colorless and transparent and had a thickness of 300 nm. A micrograph taken of the film under a polarizing microscope after 50-hour standing from deposition is shown in FIG. 4. While no crystal nuclei were observed immediately after deposition, formation of spherulites is clearly observed in the micrograph taken after 50 hours (FIG. 4). It is seen that compound (4) does not have the property of forming a stable amorphous thin film.

COMPARATIVE TEST EXAMPLE 3

Powder (5 mg) of compound (5) was placed on a glass substrate and melted by heating to 102° C. on a hot plate and rapidly cooled to form a thin film. Crystal formation occurred immediately after film formation as can be seen from FIG. 5, the micrograph taken immediately after film formation, indicating that compound (5) does not have the property of forming a stable amorphous thin film.

COMPARATIVE TEST EXAMPLE 4

Figure 6:
FIG. 6 is a micrograph taken of the film of Comparative Test Example 4 after 38-hour standing under a polarizing microscope in parallel polarizers.
Figure 7A:
FIG. 7a is a micrograph taken of the film of Comparative Test Example 4 after 46-hour standing under a polarizing microscope equipped in parallel polarizers and crossed nicols.
Figure 7B:
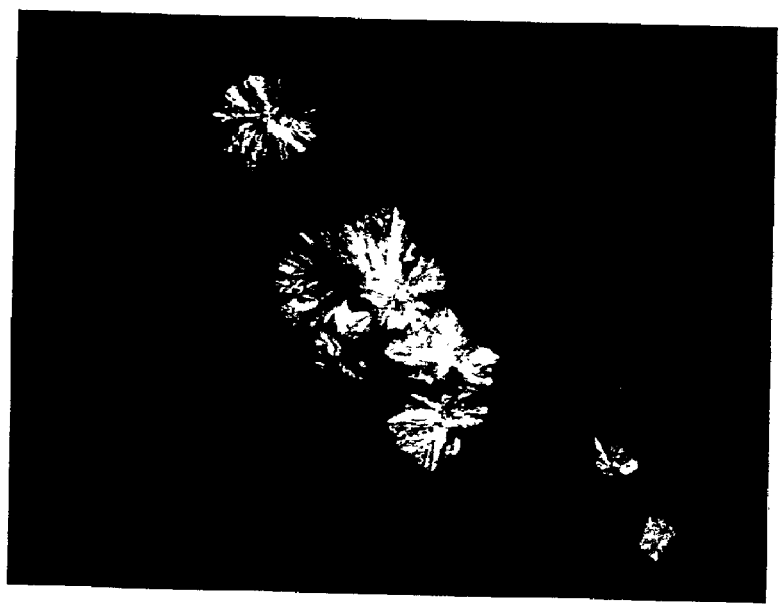
Figure 8:
FIG. 8 is a micrograph taken of the film of Comparative Test Example 5 immediately after formation under a polarizing microscope in parallel polarizers.
Figure 9:
FIG. 9 is micrographs taken of the film of Comparative Test Example 6 after 45-hour standing under a polarizing microscope in parallel polarizers and crossed nicols.

Powder (2 mg) of compound (6) was placed on a glass substrate and melted by heating to 150° C. on a hot plate and rapidly cooled, whereupon a glassy solid drop was formed. Micrographs of the solid taken under a polarizing microscope after 38-hour standing, and after 46-hour standing are shown in FIG. 6, and FIGS. 7a and 7b, respectively. Formation of crystal nuclei was obviously observed after 38 hours as in FIG. 6. The micrograph taken after 46 hours under crossed nicols (FIG. 7a) shows a number of bright spots, which were confirmed to be crystal nuclei. FIG. 7b is an enlarged micrograph of FIG. 7a. Therefore, compound (6) does not have the property of forming a stable amorphous thin film.

COMPARATIVE TEST EXAMPLE 5

Powder (2 mg) of compound (7) was placed on a glass substrate and melted by heating to 210° C. on a hot plate and rapidly cooled to form a thin film. Crystal formation occurred immediately as can be seen from FIG. 8, the micrograph taken immediately after film formation.

Therefore, compound (7) has no property of forming a stable amorphous thin film.

COMPARATIVE TEST EXAMPLE 6

Figure 10:
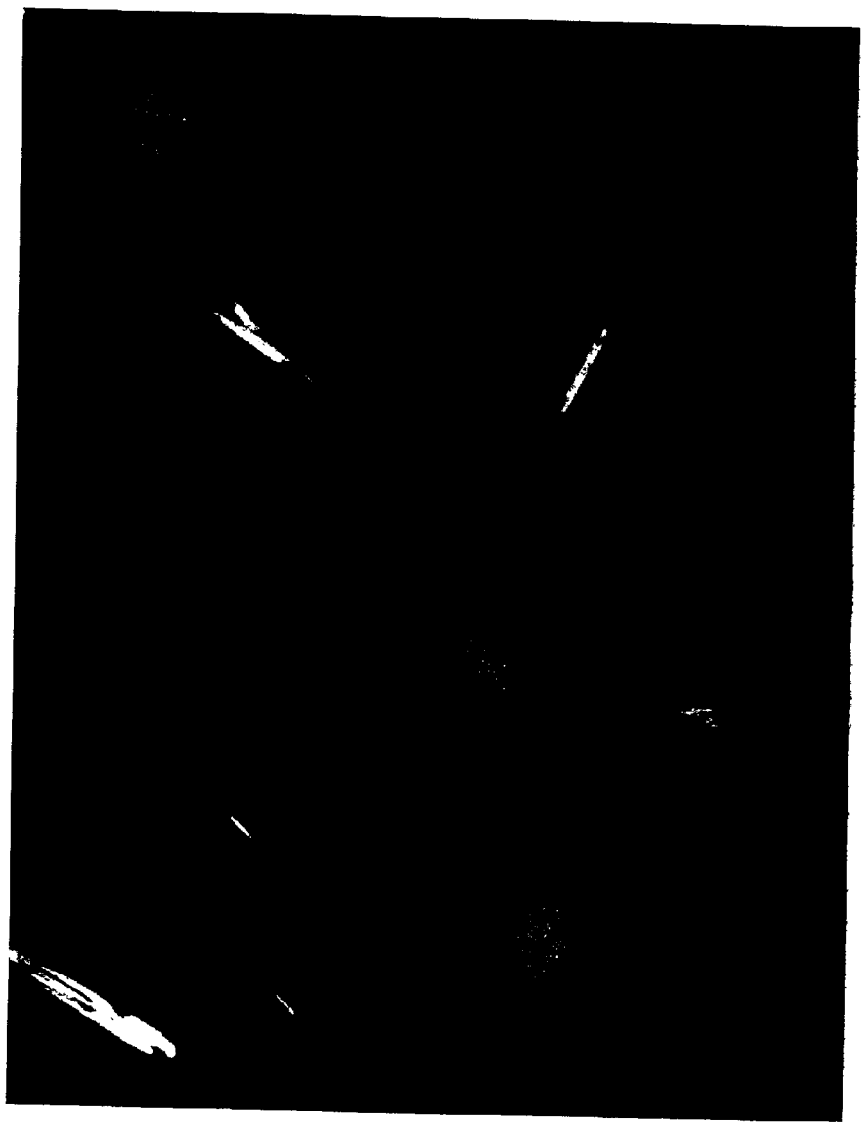
FIG. 10 is an enlarged micrograph of FIG. 9.

Crystals (5 mg) of compound (8) were dissolved in 0.2 ml of toluene. A thin film was formed by spin coating with the solution at 2500 rpm. A micrograph taken of the film under a polarizing microscope after 45-hour standing in FIG. 9. According to the examination under cross nicols, while no bright spots are observed immediately after film formation, a large number of bright spots appear after 45 hours as in FIG. 9. FIG. 10 is an enlarged micrograph of FIG. 9.

COMPARATIVE TEST EXAMPLE 7

Figure 11:
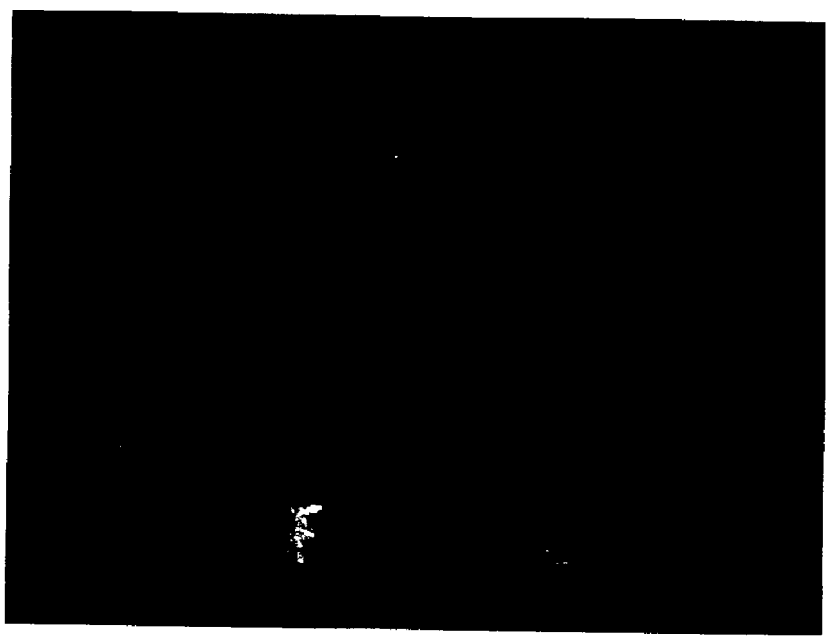
FIG. 11 is micrographs taken of the film of Comparative Test Example 7 after 45-hour standing under a polarizing microscope in parallel polarizers and crossed nicols.
Figure 12:
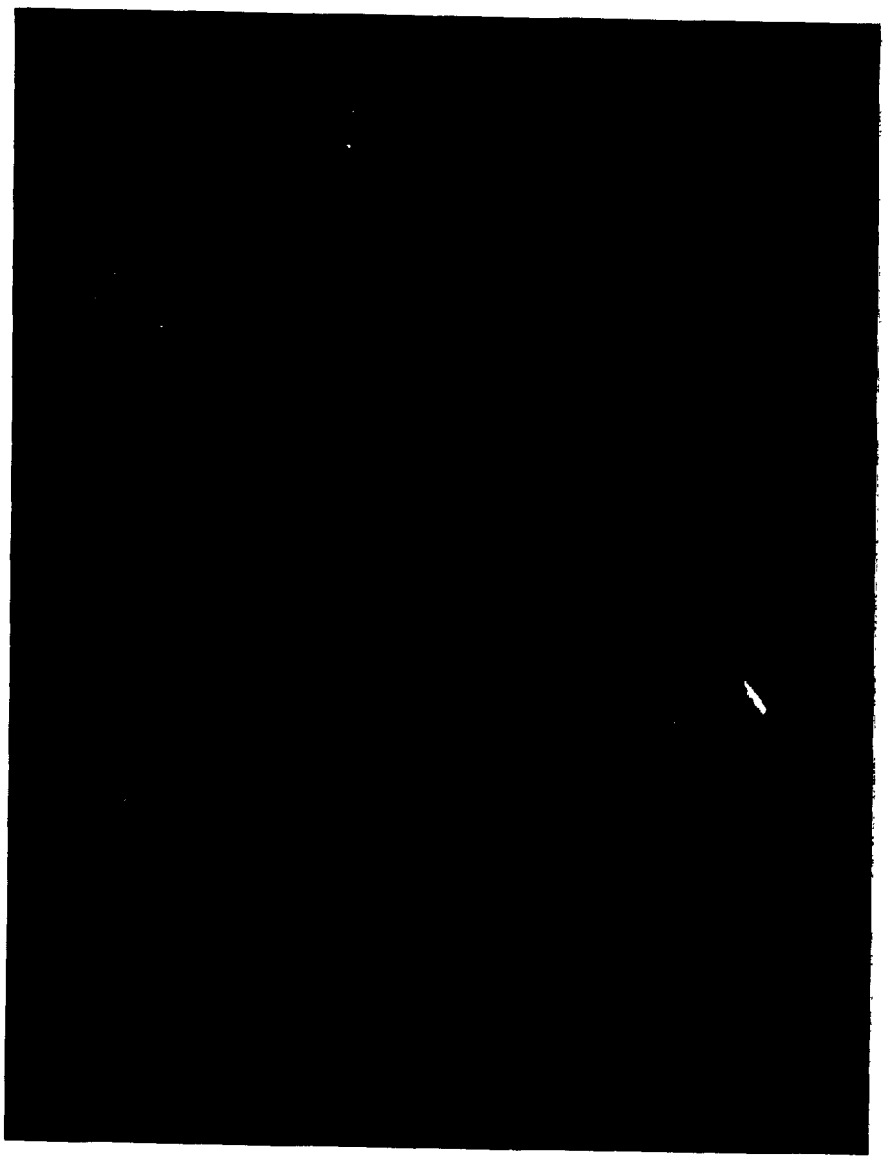
FIG. 12 is a micrograph taken of another site of the film of Comparative Test Example 7 after 45-hour standing under a polarizing microscope in crossed nicols.

A thin film of compound (9) was formed in the same manner as in Comparative Test Example 6. Micrographs taken under a polarizing microscope are shown in FIGS. 11 and 12, both of which were taken after 45 hours from the film formation. FIG. 12 is a micrograph taken of another site of the same film under crossed nicols. Bright spots under cross nicols were observed after 30 hours from the film formation, and the sample exhibited the states as in FIGS. 11 and 12 in each site after 44 hours from the film formation.

From these results, compound (9) was proved to have no property of forming a stable amorphous thin film.

According to the present invention, an amorphous recording layer comprising a photochromic compound having a glass transition point of 55° C. or higher is used. As a result there is provided a near-field optical recording medium which is capable of writing, reading and erasing information with an evanescent light having a beam diameter smaller than the wavelength of a source light. Recorded signals written on the optical recording medium of the present invention are prevented from deterioration.

Since the recording layer mainly comprises the photochromic compound in its amorphous state, it has a high density of the photochromic compound and has a very small surface roughness. This is quite advantageous for achieving high-density recording in near-field optical recording.

With the photochromic compound whose glass transition point is 55° C. or higher, it is considered that the recorded signals are prevented from being deteriorated under usually experienced conditions of use.

What is claimed is:

1. A near-field optical recording medium comprising a recording layer capable of writing, reading and erasing information using an evanescent light, the evanescent light having a beam spot size smaller than the wavelength of a source light, wherein the recording layer is a stable amorphous layer mainly comprising a photochromic compound having a glass transition point of 55° C. or higher and a molecular weight of 3000 or less, and containing substantially no binder resin.

2. A near-field optical recording medium according to claim 1, wherein the photochromic compound is a diheteroarylethene compound.

3. A near-field optical recording medium according to claim 2, wherein the diheteroarylethene compound has a pyrrole ring, a thiophene ring, a furan ring or a selenophene ring in the heteroaryl moiety thereof.

4. A near-field optical recording medium according to claim 3, wherein the diheteroarylethene compound is represented by formula (I):

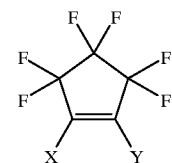

(I)

wherein X and Y each independently represents a partial structure represented by formula (a) or (b):

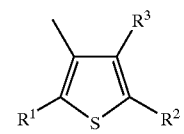

(a)

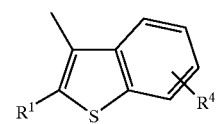

(b)

wherein $R^1$ represents a substituted or unsubstituted alkyl group, or a substituted or unsubstituted alkoxy group; $R^2$ represents a substituted or unsubstituted alkyl group, a substituted or unsubstituted alkoxy group, a substituted or unsubstituted alkylthio group, a substituted or unsubstituted aromatic group, or a substituted or unsubstituted aromatic heterocyclic group; $R^3$ represents a hydrogen atom, a substituted or unsubstituted alkyl group or a substituted or unsubstituted alkoxy group; and $R^4$ represents a hydrogen atom, a substituted or unsubstituted alkyl group, a substituted or unsubstituted alkenyl group, a substituted or unsubstituted alkoxy group, a substituted or unsubstituted alkylthio group, a substituted or unsubstituted aromatic group, a substituted or unsubstituted aromatic heterocyclic group, a substituted or unsubstituted aryloxy group, a substituted or unsubstituted arylthio group, a substituted or unsubstituted heteroaryloxy group or a substituted or unsubstituted heteroarylthio group; provided that when X and Y both represent the structure (b), two $R^4$'s do not simultaneously represent a hydrogen atom.

5. A near-field optical recording medium according to claim 4, wherein at least one of X and Y in formula (I) represents a partial structure represented by formula (a'):

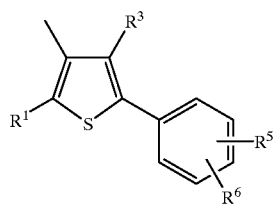

(a')

wherein $R^1$ and $R^3$ are as defined in claim 4; and $R^5$ and $R^6$ each independently represents a hydrogen atom, a substituted or unsubstituted alkyl group, a substituted or unsubstituted alkenyl group, a substituted or unsubstituted alkoxy group, a substituted or unsubstituted alkylthio group, a substituted or unsubstituted aromatic group, a substituted or unsubstituted aromatic heterocyclic group, a substituted or unsubstituted aryloxy group, a substituted or unsubstituted arylthio group, a substituted or unsubstituted heteroaryloxy group or a substituted or unsubstituted heteroarylthio group.

6. A near-field optical recording medium according to claim 5, wherein in formula (I), X represents the partial structure (a'), and Y represents the partial structure (b), provided that $R^4$, $R^5$ and $R^6$ in a molecule do not simultaneously represent a hydrogen atom.

7. A near-field optical recording medium according to claim 5, wherein X and Y in formula (I) both represent the partial structure (a'), provided that $R^5$'s and $R^6$'s in a molecule do not simultaneously represent a hydrogen atom.

8. A near-field optical recording medium according to claim 4, wherein X and Y in formula (I) both represent the partial structure (b).

9. A near-field optical recording medium according to claim 1, wherein the photochromic compound has a glass transition point of 60° C. or higher.

10. A near-field optical recording medium according to claim 1, wherein the recording layer contains substantially no binder.

11. A near-field optical recording medium according to claim 1, wherein the recording layer has an optical density of 0.4 or greater per 100 nm thickness.

12. The near-field optical recording medium according to claim 1, wherein said recording layer comprises at least 90% by weight of said photochromic compound.

13. A near-field optical recording method, which comprises:

irradiating the entire surface of a recording layer of an optical recording medium with an ultraviolet ray in advance, the recording layer being a stable amorphous layer mainly comprising at least 90% by weight of a photochromic compound having a glass transition point of 55° C. or higher and a molecular weight of 3000 or less, so as to convert the photochromic compound to a ring-closed compound; and ring-opening the ring-closed compound with an evanescent light having a beam spot size smaller than the wavelength of a source light, the source light having a visible light wavelength, thereby to record signals.

14. A near-field optical recording method, which comprises:

irradiating the entire surface of a recording layer of an optical recording medium with a visible light in advance, the recording layer being a stable amorphous layer mainly comprising at least 90% by weight of a photochromic compound having a glass transition point of 55° C. or higher and a molecular weight of 3000 or less, so as to convert the photochromic compound to a ring-opened compound; and ring-closing the ring-opened compound with an evanescent light having a beam spot size smaller than the wavelength of a source light, the source light having an ultraviolet ray wavelength, thereby to record signals.

* * * * *